(12) United States Patent
Kristensen

(10) Patent No.: US 9,702,149 B2
(45) Date of Patent: Jul. 11, 2017

(54) TUBULAR SKYLIGHT DIFFUSER ELEMENT AND METHOD OF MANUFACTURING A DIFFUSER ELEMENT

(71) Applicant: VKR HOLDING A/S, Hørsholm (DK)

(72) Inventor: Kristian Nitzsch Kristensen, Galten (DK)

(73) Assignee: VKR Holding A/S, Horsholm (DK)

( * ) Notice: Subject to any disclaimer, the term of this patent is extended or adjusted under 35 U.S.C. 154(b) by 0 days.

(21) Appl. No.: 14/954,255

(22) Filed: Nov. 30, 2015

(65) Prior Publication Data

US 2016/0153194 A1    Jun. 2, 2016

(30) Foreign Application Priority Data

Nov. 28, 2014 (DK) ................................. 2014 70746
Nov. 28, 2014 (DK) ................................. 2014 70747

(51) Int. Cl.
  *E04D 13/03* (2006.01)
  *G02B 5/02* (2006.01)

(52) U.S. Cl.
  CPC ......... *E04D 13/033* (2013.01); *G02B 5/0278* (2013.01); *E04D 2013/0345* (2013.01)

(58) Field of Classification Search
  CPC .......... G02B 5/0278; E04D 2013/0345; E04D 13/033; E04D 13/03; E04D 13/1476
  USPC .......................................................... 52/200
  See application file for complete search history.

(56) References Cited

U.S. PATENT DOCUMENTS

| | | |
|---|---|---|
| 5,493,824 A | 2/1996 | Webster et al. |
| 5,655,339 A * | 8/1997 | DeBlock ............ E04D 13/03 359/591 |
| 5,896,713 A | 4/1999 | Chao et al. |
| 6,035,593 A | 3/2000 | Chao et al. |
| 6,412,238 B2 | 7/2002 | Rillie et al. |
| 6,438,803 B2 | 8/2002 | Rillie et al. |

(Continued)

FOREIGN PATENT DOCUMENTS

| | | |
|---|---|---|
| AU | 2007200481 A1 | 12/2007 |
| WO | 2011004278 A1 | 1/2011 |
| WO | 2011071945 A1 | 6/2011 |

OTHER PUBLICATIONS

European Search Report and Opinion for EP application 15196288 dated Apr. 6, 2016 2016.

*Primary Examiner* — Brian Glessner
*Assistant Examiner* — Adam Barlow
(74) *Attorney, Agent, or Firm* — Timothy D. St. Clair; Nexsen Pruet, LLC

(57) ABSTRACT

A tubular skylight is provided, comprising a roof mounted element for collecting exterior light, a ceiling mounted element, and a tube connecting the roof mounted element and the ceiling mounted element. The skylight includes a diffuser element mounted in the ceiling mounted element for distributing the exterior light in a room. The diffuser element includes a first diffuser pane having a translucent bottom portion and a sidewall portion with a translucent light path zone. The tubular skylight has means for affecting the luminance of the light exiting the diffuser such that the luminance of light exiting through the light path zone has a different luminance than light exiting through the bottom portion. The ceiling mounted element and the diffuser element provide a light passage from the light path zone to the room by a free space adjacent the light path zone.

10 Claims, 10 Drawing Sheets

(56) References Cited

U.S. PATENT DOCUMENTS

| | | | | |
|---|---|---|---|---|
| 6,918,216 B2* | 7/2005 | Hoy | ............... | E04D 13/03 |
| | | | | 359/591 |
| 7,607,266 B2* | 10/2009 | O'Hagin | ............... | E04D 1/30 |
| | | | | 52/18 |
| 9,453,343 B1* | 9/2016 | Brinton | ............... | E04D 13/032 |
| 2003/0066254 A1* | 4/2003 | DeBlock | ............... | E04D 13/03 |
| | | | | 52/200 |
| 2007/0035841 A1 | 2/2007 | Kinney et al. | | |
| 2008/0302032 A1* | 12/2008 | Valentz | ............... | E04D 13/03 |
| | | | | 52/200 |
| 2011/0141570 A1* | 6/2011 | Rillie | ............... | F21S 11/007 |
| | | | | 359/598 |
| 2012/0174506 A1* | 7/2012 | Buckley | ............... | E04D 13/03 |
| | | | | 52/200 |
| 2012/0230020 A1* | 9/2012 | Rillie | ............... | F21S 19/00 |
| | | | | 362/147 |
| 2012/0272593 A1* | 11/2012 | O'Neill | ............... | E04D 13/03 |
| | | | | 52/200 |

* cited by examiner

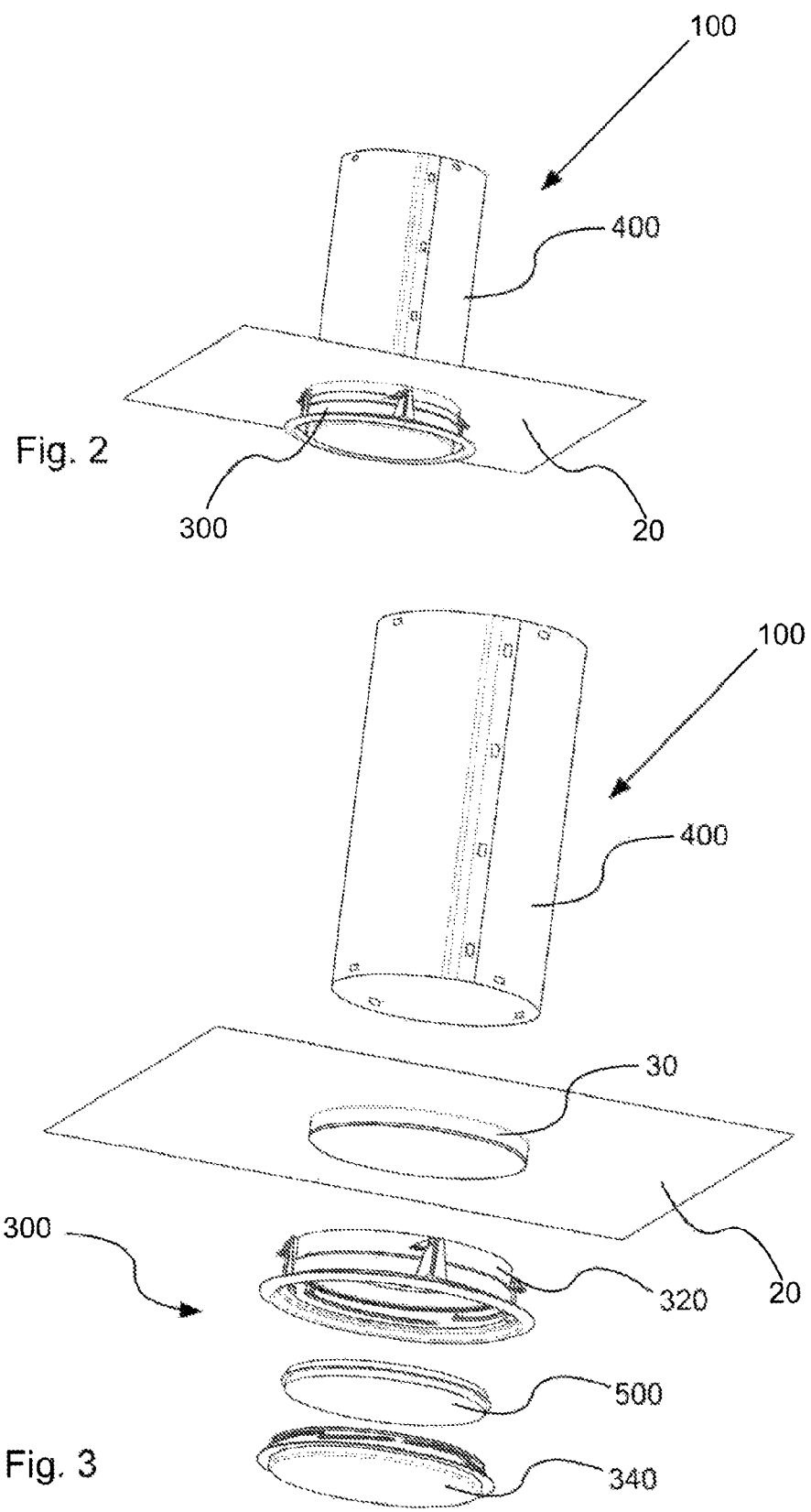

TUBULAR SKYLIGHT DIFFUSER ELEMENT AND METHOD OF MANUFACTURING A DIFFUSER ELEMENT

CROSS-REFERENCE TO RELATED APPLICATIONS

This application claims priority under 35 U.S.C. §119 to Denmark patent application PA 2014 70746, filed Nov. 28, 2014, and to Denmark patent application PA 2014 70747, filed Nov. 28, 2014, the disclosures of both of which are incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIALS SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The current invention relates to a tubular skylight comprising a roof-mounted element for collecting exterior light, a ceiling mounted element, a tube connecting the roof mounted element and the ceiling mounted element and a diffuser element mounted in the ceiling mounted element. Moreover, the current invention relates to an accessory diffuser element suitable for mounting in a tubular skylight. Additionally, the current invention relates to a method of manufacturing a diffuser element.

Description of the Related Art

Tubular skylights provide natural light to the interior of a building by capturing daylight in the roof-mounted element and bringing the light through the tube and into the room through a diffuser element. The diffuser element may be translucent. The diffuser element achieves two effects: (1) it diffuses the light entering the room and (2) it hides the internal structural details of the tubular skylight from normal viewing angles of a person in the room. These types of skylights often have diffuser elements that are flush or close to flush with the ceiling. Moreover the diffuser element is typically planar.

Tubular skylights may provide a path through the ceiling insulation and roof for heat to flow from the inside of a building to the outside in a cold season and from the outside of the building to the inside in a warm season. When the temperature difference between the outside and the inside of the building is sufficiently great, heat flowing through the skylight, in either direction, may cause discomfort to the occupants of the building. The temperature difference may undesirably require additional heating or cooling inside the building to maintain comfort for the building occupants. In prior art tubular skylights this problem was addressed by adding discrete holding pieces attached to the interior of the tube element by adhesive tape. One or more discs of transparent material were moved past the holding pieces while the surface of the discs were oriented in vertical position. After passing the holding pieces, the discs were rotated into horizontal position and positioned and supported on the holding pieces. The principle required many parts that have to be installed correctly into the interior of the tube.

One object of the present invention is to increase the amount of natural light that enters the room through the tubular skylight Another object of the present invention to provide a tubular skylight and an accessory that is easy to install in the tubular skylight.

A further object of the present invention to provide a method of mounting an accessory in a tubular skylight.

BRIEF SUMMARY OF THE INVENTION

As used herein, the terms "translucent" and "translucence" is the physical property of allowing light to pass through a material, by which light may or may not be scattered at the two interfaces of the material or internally. Less translucent material allows more the light to be scattered and more translucent material scatters light less.

As used herein, the term "transparent" is a sub-set of the physical property of translucence. Transparent is the physical property of allowing light to pass through a material without being scattered, that is, it not only allows transport of light but also image formation through the material.

As used herein, the term "central axis" is an axis defined by the centers of all cross-sections through an element in planes parallel to the ceiling where the tubular skylight is installed.

As used herein, the term "planar" describes an element having a width-to-height ratio of more than 6:1. In certain cases, the term planar may refer to an element having a width-to-height ratio of more than 10:1, of more than 15:1 or of more than 20:1. For a non-circular element the circumscribed circle defines the width of the element. Examples of non-circular elements are elliptic, triangular, square, pentagonal, hexagonal, heptagonal, octagonal, nonagonal and decagonal.

As used herein, the terms "comprise," "comprising," and "comprised of" may be taken to specify the presence of stated features, integers, steps, or components but does not preclude the presence or addition of one or more other features, integers, steps, components, or groups thereof.

As used herein, the term "shelf" defines a device that bears the weight of another thing. The shelf can therefore support a load having a vertical component, e.g. the force of gravity.

In accordance with certain aspects of certain embodiments of the present technology, a tubular skylight is disclosed that includes a roof mounted element for collecting exterior light, a ceiling mounted element, and a tube connecting the roof mounted element and the ceiling mounted element. The ceiling mounted element may define a first bore and the tube may define a second bore, and the smaller of the first bore and the second bore may define a first inscribed diameter. A diffuser element may also be included, wherein the diffuser element may be mounted in the ceiling mounted element. The diffuser element may comprise a first diffuser pane with a translucent bottom portion and a sidewall portion with a translucent light path zone. The tubular skylight may have means configured for affecting the luminance of the light exiting the diffuser such that the luminance of light exiting through the light path zone has a different luminance than light exiting through the bottom portion The bottom portion may be substantially planar and may have a width-to-height ratio of more than six-to-one. The bottom portion may adjoin the sidewall portion at a transition line, wherein the sidewall portion may be substantially parallel to a central axis defined through the diffuser element, and wherein the ceiling mounted element and the diffuser element may be configured for providing a light passage from the light path zone to the room in the form of a free space adjacent the light path zone.

In accordance with additional aspects of other embodiments of the present technology, a diffuser element may be configured for being mounted in the ceiling mounted element, wherein the diffuser element includes a first diffuser pane with a bottom portion and a sidewall portion wherein the bottom portion may be translucent, wherein the sidewall portion may have a light path zone that may be more translucent than the bottom portion, wherein the bottom portion may be substantially planar having a width-to-height ratio of more than 6:1, wherein the bottom portion adjoins the sidewall portion at a transition line, wherein the sidewall portion may be substantially parallel to a central axis through the diffuser element, and wherein a free space adjacent the light path zone may provide a light passage from the light path zone to the room. The diffuser element may serve to distribute the exterior light in a room and/or diffuse light when it enters the room from the tubular skylight. The diffuser element may comprise a first diffuser pane with a bottom portion and a sidewall portion. The bottom portion may be substantially planar. When the diffuser element is installed in the tubular skylight, the bottom portion may be substantially parallel with the ceiling. In installations where the ceiling may be horizontal, the bottom portion may be substantially horizontal as well. The sidewall portion may be substantially parallel to the central axis through the diffuser element. In a particular embodiment, the transition line may be a closed two-dimensional figure contained in a plane normal to the central axis through the diffuser element. In another embodiment the external surface of the bottom portion and the external surface of the sidewall portion may have different angles at their junction at the transition line. In this embodiment the external surface will appear to have an edge at the transition line. The transition line may be clearly visible. In yet another embodiment the external surface of the bottom portion and the external surface of the sidewall portion may have equal angles at their junction at the transition line. In this embodiment the transition line may be invisible and the external surface of the diffuser element may be smooth. The sidewall portion may have a light path zone. In still another embodiment, the light path zone may cover the entire sidewall portion. Still further, the light path zone may cover part of the sidewall portion. In accordance with still further aspects of other embodiments of the present technology, the bottom portion and the sidewall portion may adjoin along a transition line. The transition line may be located on the external surface of the first diffuser pane. The diffuser element and the ceiling mounted element may be configured such that light may escape through the light path zone and enter the room. For that purpose, a free space may be located adjacent the light path zone providing a light path free of obstacles between the light path zone and the room. The size and shape of the free space may be governed by the actual installation and a trade-off between providing unfiltered light but at the same time restricting the visibility of the internal structure of the tubular skylight.

Light may enter the tubular skylight through the roof mounted element and travel through the tube to the diffuser where it may exit the tubular skylight partly through the bottom portion and partly through the light path zone.

In one embodiment of the tubular skylight, the diffuser element may have a shape selected among the following: circular, elliptical, oval, and polygonal, or a combination thereof. Examples of polygonal shapes that may be selected are triangular, square, pentagonal, hexagonal, heptagonal, octagonal, nonagonal, and decagonal.

In accordance with yet additional aspects of other embodiments of the present technology, method of manufacturing a diffuser element is provided, wherein the method comprises the steps of providing a mold for injection molding a first diffuser pane, including by applying a surface texture to the part of the mold that establishes the bottom portion and wherein the surface texture may be configured for applying translucency to the bottom portion.

In accordance with still further aspects of other embodiments of the present technology, the appearance of the light exiting through the side of the diffuser may appear to be different than the light exiting through the bottom of the diffuser. In particular embodiments, the means configured for affecting the luminance of the light exiting the diffuser may be configured such that the luminance of the light exiting through the light path zone has a higher luminance than the light excitng through the bottom portion. In certain configurations, the light path zone will appear to be brighter than the bottom portion. In accordance with yet still further aspects of other embodiments of the present technology, the luminance of the light exiting the diffuser may be achieved with a light path zone that may be more translucent than the bottom portion. In some examples, the amount of natural light that enters the room increases as a result of a light path zone with a higher translucency adding to the natural light supplied through the bottom portion. In selective illustrations, the effect of the translucent light path zone on the sidewall portion may cause the side of the diffuser to appear as if it may be glowing when subject to sufficient exterior light, caused by the difference in translucence between the light path zone and the bottom portion that may be less translucent than the light path zone, with the amount of diffusion being less through the light path zone than through the bottom portion.

In specific representations, the means configured for affecting the luminance of the light exiting the diffuser may be a light source near the light path zone. In another instance, the means configured for affecting the luminance of the light exiting the diffuser may be a prism.

In accordance with certain aspects of certain embodiments of the present technology, the roof mounted element may comprise a roof adapter and a window element, for example a window pane. The roof adapter may be mounted in the roof of a building and may serve to secure the window element and one end of the tube in position.

In accordance with additional aspects of other embodiments of the present technology, the ceiling mounted element may comprise a ceiling ring to be mounted in the ceiling structure of the building. The ceiling ring may be circular, square, elliptical, oval, polygonal, or any combination thereof. The ceiling ring may be an adapter in which the diffuser element and the lower end of the are installed and held in position.

In accordance with yet additional aspects of other embodiments of the present technology, the tube may be positioned between the roof mounted element and the ceiling mounted element. For advantageous reasons in some applications, the internal surface of the tube may be made of a reflective material.

In accordance with yet still further aspects of other embodiments of the present technology, the light path zone y be transparent. With this embodiment it may be achieved to increase further the amount of natural light that may be provided to the room. The light that enters the room through the light path zone may be unfiltered. When the sun is shining outside, the light rays that enter through the light path zone will appear as unfiltered sunlight. Moreover, the effect of the glowing side of the diffuser may be more pronounced. With the method according to the invention, the translucent effect in the bottom portion may be achieved in a way that would require no extra steps as soon as the mold may be finished.

In accordance with certain aspects of certain embodiments of the present technology, the level of translucency may be determined by the surface texture. It may be possible to select the translucency by applying a certain surface texture. In an alternative embodiment the translucency may be applied by applying translucent foil on either the internal or external surface of the bottom portion.

An embodiment of the tubular skylight according to the invention may be further distinguished in that the sidewall portion may extend into the ceiling mounted element. In some embodiments, the sidewall may have a substantially planar cross-section in a plane extending radially from the central axis. Optionally, the sidewall portion may be inclined between 5° to −10° in relation to the central axis. In some applications, the sidewall portion, in a horizontally oriented diffuser element with the outside surface of the diffuser element facing downwards, has a positive inclination when the central axis and the sidewall have a vertex located below the diffuser element. Correspondingly the sidewall portion may have a negative inclination where the centerline and the sidewall portion have a vertex located above the diffuser element.

In accordance with additional aspects of other embodiments of the present technology, the transition line may be chamfered or rounded. The transition line may be removed and may become an imaginary line outside the chamfer or rounding.

In accordance with yet additional aspects of other embodiments of the present technology, the tubular skylight may comprise a reflector, wherein the reflector has a reflective surface facing the light path zone, and wherein the reflective surface may be arranged with an acute angle in relation to the central axis and with a vertex above the bottom portion. The reflector may reflect light exiting the light path zone. Light rays that are directed horizontal or near horizontal may change direction to a vertical or near vertical direction because of the acute angle. The reflector may be arranged adjacent the light path zone, leaving room for the free space adjacent the light path zone. The free space may insure a passage for the light between the light path zone and the room.

In accordance with still further aspects of other embodiments of the present technology, the reflector may be a ring with a shape corresponding to the sidewall.

In accordance with yet still further aspects of other embodiments of the present technology, the diffuser element may comprise a second diffuser pane and a spacer element to space the second diffuser pane from the first diffuser pane and provide a closed air space between the first and second diffuser panes, to prevent debris and insects from building up on the internal surface of the first diffuser pane. Moreover, the heat transfer coefficient of the diffuser element may thereby be improved.

In accordance with certain aspects of certain embodiments of the present technology, the second diffuser pane may be translucent, at least in part to prevent debris and insects on the second diffuser pane from being visible from the room below.

In accordance with additional aspects of other embodiments of the present technology, the second diffuser pane may be transparent. In this embodiment, debris and insects may be vaguely visible through the first diffuser pane from the room below.

In accordance with yet additional aspects of other embodiments of the present technology, the diffuser element may comprise a ledge, wherein the ledge may be protruding from the sidewall portion, and wherein the light path zone may be arranged between the ledge and the bottom portion. The ledge may provide means of covering and thereby hiding mounting means for securing the ceiling ring and/or the reflector, if applicable, to the ceiling.

In accordance with still further aspects of other embodiments of the present technology, the diffuser element may be circular, an external thread may be formed on the sidewall portion, and a cooperating internal thread may be formed in the ceiling mounted element, for ease of installation and removal.

In accordance with yet still further aspects of other embodiments of the present technology, the ceiling ring and the diffuser element may have co-operating sealing means, providing sealing between the ceiling ring and diffuser element, when the diffuser element may be inserted axially into the ceiling ring. The sealing means may comprise an O-ring located on an upward facing surface on the diffuser element or a downwards facing surface on the ceiling ring. When the diffuser element is inserted axially in the ceiling ring the sealing means ray abut a surface on the opposite element. Other examples of suitable sealing means may be selected among sealing strips having open or closed cross-sections. The thread may provide a means of achieving a uniform sealing pressure.

In accordance with certain aspects of certain embodiments of the present technology, a skylight is disclosed, comprising a roof mounted element, a ceiling mounted element, a tube connecting the roof mounted element and the ceiling mounted element, and a diffuser element wherein the diffuser element may be mounted in the ceiling mounted element. The diffuser element may comprise a first diffuser pane with a bottom portion and a sidewall portion, wherein the sidewall portion may be substantially parallel to a central axis through the diffuser element, wherein the diffuser element may comprise a ledge, and wherein the ledge may be protruding from the sidewall portion.

In accordance with yet additional aspects of other embodiments of the present technology, a tubular skylight is provided, comprising a roof mounted element, for collecting exterior light, a ceiling mounted element, a tube, connecting the roof mounted element and the ceiling mounted element, and a diffuser element wherein the diffuser element may be mounted in the ceiling mounted element, wherein the diffuser element may comprise a first diffuser pane with a bottom portion and a sidewall portion, wherein the sidewall portion may be substantially parallel to a central axis through the diffuser element, wherein the diffuser element may be circular, wherein an external thread may be formed on the sidewall portion and wherein a cooperating internal thread may be formed in the ceiling mounted element.

In accordance with still further aspects of other embodiments of the present technology, the ceiling ring and the diffuser element may have co-operating sealing means, for providing sealing between the ceiling ring and diffuser element, when the diffuser element may be inserted axially into the ceiling ring. The sealing means may comprise an O-ring located on an upward facing surface on the diffuser element or a downwards facing surface on the ceiling ring. When the diffuser element may be inserted axially in the ceiling ring the sealing means may abut a surface on the opposite element. In particular embodiments, the sealing means may be selected among sealing strips having open or closed cross-sections. The thread may provide a means of achieving a uniform sealing pressure.

In accordance with certain aspects of certain embodiments of the present technology, a diffuser element for mounting in a tubular skylight may comprise a first diffuser pane with a bottom portion and a sidewall portion, wherein the sidewall portion may be substantially parallel to a central axis through the diffuser element, wherein the diffuser element may be circular, wherein an external thread may be formed on the sidewall portion, and wherein a cooperating internal thread may be formed in the ceiling mounted element.

In accordance with additional aspects of other embodiments of the present technology, a tubular skylight is disclosed comprising a roof mounted element, a ceiling mounted element defining a first bore, a tube connecting the roof mounted element and the ceiling mounted element and defining a second bore wherein the smaller bore of the first bore and the second bore defines a first inscribed diameter, a diffuser element mounted in the ceiling mounted element, and an accessory comprising a first element configured for being mounted in one of the ceiling mounted element and the tube. The first element may be a rigid disc or ring-shaped element and a holding means configured for retaining the position of the accessory within the ceiling mounted element or tube. The holding means may be connected to the periphery of the first element, and the holding means may comprise a resilient element, wherein the resilient element may be configured for allowing the circumscribed diameter of the accessory to vary at least between a minimum value equal to the first inscribed diameter and a maximum value exceeding the first inscribed diameter.

In accordance with yet additional aspects of other embodiments of the present technology, the accessory may comprise a first element configured for being mounted in one of the ceiling mounted element and the tube, wherein the first element may be a rigid disc or ring-shaped element, a holding means configured for retaining the position of the accessory within the ceiling mounted element or tube, wherein the holding means may be connected to the periphery of the first element, and that the holding means may comprise a resilient element configured for allowing the circumscribed diameter of the accessory to vary at least between a minimum value equal to the first inscribed diameter and a maximum value exceeding the first inscribed diameter.

In accordance with still further aspects of other embodiments of the present technology, a tubular skylight is disclosed, comprising a first element configured for being mounted in one of the ceiling mounted element and the tube, and a holding means configured for retaining the position of the accessory within the ceiling mounted element or tube wherein the first element may be a rigid disc or ring-shaped element, wherein the accessory may be inserted in the bore of the ceiling mounted element or the tube, wherein the holding means applies a normal force on the inner surface of the bore of the ceiling mounted element or the tube and thereby retains the accessory in the ceiling mounted element or the tube via friction when installed in the tubular skylight, and wherein the accessory when inserted further in the bore of the ceiling mounted element or the tube expands and rests on a shelf formed in the ceiling mounted element or the tube.

In accordance with yet still further aspects of other embodiments of the present technology, the installation of the accessory may be provided that has little or no impact to the performance of the tubular skylight. In particular embodiments, this may be caused by the holding means being attached to the periphery of the accessory. Therefore the part of the area of the light path through the tubular skylight occupied by the holding means may be small or even non-existent.

In accordance with certain aspects of certain embodiments of the present technology, the roof mounted element may comprise a roof adapter and a window pane. The roof adapter may be mounted in the roof of a building and serve to secure the window pane and one end of the tube in position.

In accordance with additional aspects of other embodiments of the present technology, the ceiling mounted element may comprise a ceiling ring to be mounted in the ceiling structure of the building. The ceiling ring may be circular, square, elliptical, oval, polygonal, or any combination thereof. The ceiling ring may be an adapter in which the diffuser element and the other end of the tube may be installed and securely held in position. The ceiling ring may have a bore with an inscribed diameter.

In accordance with yet additional aspects of other embodiments of the present technology, the tube may be positioned between the roof mounted element and the ceiling mounted element. The internal surface of the tube may be made of a reflective material. The accessory may be mounted in the tube. The bore of the tube may be smaller or larger than the bore of the ceiling mounted element. The bore of the tube may have an inscribed diameter. In some applications, when comparing the two bores, the smaller of the two may define the first inscribed diameter. The first inscribed diameter may define the size of the largest object with an orientation normal to a longitudinal axis through the bores that will pass through the bore of the ceiling mounted element and the bore of the tube.

In accordance with yet still further aspects of other embodiments of the present technology, the accessory may be mounted in the bore of the ceiling mounted element or more specifically the ceiling ring or the tube.

In accordance with certain aspects of certain embodiments of the present technology, the diffuser element may diffuse light entering the room from the tubular skylight. The diffuser element may comprise a window pane that may be made of a translucent material. The diffuser element may be removably attached to the ceiling ring.

In accordance with additional aspects of other embodiments of the present technology, light may enter the tubular skylight through the roof mounted element and travels through the tube to the diffuser where it may exit the tubular skylight.

In accordance with yet additional aspects of other embodiments of the present technology, the accessory may comprise a first element and a holding means. The holding means may comprise a resilient element. Therefore the circumscribed diameter of the accessory may vary as the resilient element may be compressed or expanded.

In accordance with still further aspects of other embodiments of the present technology, the first element may be a rigid disc or ring-shaped element.

In certain configurations, the resilient element of the holding means may be an annular element.

In some examples, the resilient element of the holding means may comprise a plurality of discrete elements.

In individual forms, the holding means further may comprise a sealing element for sealing against the ceiling mounted element and/or the tube. In selective illustrations, the holding function and the sealing function may be separated into two separate elements; alternatively, the holding functions and the sealing functions may be combined into one and the same element, for example, an embodiment with a single annular resilient element that tightly abuts the inside surface of the tube and/or ceiling mounted element.

In accordance with yet still further aspects of other embodiments of the present technology, the disc or ring-shaped element may have shape selected among the following: circular, elliptical, oval, and polygonal, or a combination of the aforementioned shapes. Examples of polygonal shapes that may be selected are triangular, square, pentagonal, hexagonal, heptagonal, octagonal, nonagonal, and decagonal.

In accordance with certain aspects of certain embodiments of the present technology, the accessory and the bore of the ceiling ring and/or tube may nave corresponding shapes, for example square or circular.

In accordance with additional aspects of other embodiments of the present technology, the accessory may be made to seal tightly against the inner surface of the bore of the ceiling ring and/or the tube. In its relaxed state, the circumscribed diameter of the accessory may be larger than the first inscribed diameter.

In accordance with yet additional aspects of other embodiments of the present technology, the accessory may be configured for being mounted in the ceiling mounted element and/or the tube by adapting its shape and circumscribed diameter to enable the accessory to pass through the bore of the ceiling mounted element. The accessory may be configured for being mounted only in the ceiling mounted element or only in the tube.

In accordance with still further aspects of other embodiments of the present technology, the accessory may be configured for being mountable in both the ceiling mounted element and the tube. In this embodiment the same accessory may be mounted in the ceiling mounted element in some installations and in the tube in other installations. During installation through the ceiling mounted element, the accessory may be adapted for being in a horizontal or vertical orientation or in any intermediate orientation between horizontal and vertical. The orientation as the accessory may be installed should be considered during design of the ceiling mounted element, the tube and the accessory. The accessory can have different applications. For example the accessory can be configured as a thermal insulator for improving the U-value of the tubular skylight, a filter for affecting the properties of the light entering a diffuser element, a lamp for providing light when it may be dark outside the building or for adding to the light entering through the tubular skylight, or any other type of accessory suitable for use in a tubular skylight.

In accordance with yet still further aspects of other embodiments of the present technology the holding means may have a funnel-shaped extension with a reflective surface. The funnel-shaped extension may extend above the accessory when installed in the tubular skylight.

In accordance with certain aspects of certain embodiments of the present technology, it may be achieved that e space between the bore of the ceiling mounted element and the bore of the tube due to a difference in the shape and sizes of the two elements may be covered by the funnel-shaped extension and light may be not thereby not lost due to the space. The same may be true for any differences in shape and size between the accessory and the tube and/or ceiling mounted element.

In accordance with additional aspects of other embodiments of the present technology, the ceiling mounted element or tube may comprise a shelf having a support surface, wherein the support surface may have a maximum extent with a second inscribed diameter, wherein the first inscribed diameter may be smaller than the second inscribed diameter, wherein the minimum extension of the support surface may be equal to or larger than the first inscribed diameter, and wherein the holding means may be configured for resting on the support surface.

In accordance with yet additional aspects of other embodiments of the present technology, the support surface of the shelf may be horizontal in the installed orientation of the tubular skylight or angled up to a close-to-vertical orientation, as long as the support surface may be able to support the weight of the accessory and maintain the accessory in its intended position within the ceiling mounted element or the tube. The support surface of the shelf may be provided by an area that may be bounded by, as a minimum, the first inscribed diameter and, as a maximum, the second inscribed diameter. The holding means may be configured for resting on the support surface by having at least part of its structure overlapping the support surface, when the accessory may be positioned on the shelf.

In accordance with still further aspects of other embodiments of the present technology, the shelf may be a separate element that may be inserted and fastened to the ceiling mounted element or the tube. The inscribed diameter of the shelf may be used when comparing the bore of the ceiling ring and the bore of the tube to find the first inscribed diameter. If the inscribed diameter of the shelf is smaller than the bore of the ceiling ring or the bore of the tube, the inscribed diameter of the shelf may become the first inscribed diameter.

An embodiment of the tubular skylight according to the invention may be further distinguished in that the holding means may be configured for applying a normal force on the inner surface of the bore or tube and thereby retaining the accessory in the tube via friction.

It may be herewith achieved that the accessory can be installed in various positions within the tubular skylight provided that the difference between the first inscribed diameter and the circumscribed diameter of the accessory is sufficiently small for the resilient element to apply a normal force of a sufficient magnitude for the accessory to stay in position.

In accordance with yet still further aspects of other embodiments of the present technology, the accessory may comprise a lens, the position of the focal point of the lens being adjustable by the positioning of the accessory within the tubular skylight and thereby changing the functioning and performance of the accessory.

In particular embodiments, the holding means may be configured to expand upon insertion of the accessory into the ceiling element or the tube and thereby apply the normal force on the inner surface of the bore or tube.

In some examples, the magnitude of the normal force required to hold the accessory in position may be governed by the combined friction coefficient of the holding means and the inner surface of the bore or tube.

In accordance with certain aspects of certain embodiments of the present technology, the holding means may be formed such that the circumscribed diameter of the accessory may be larger than the first inscribed diameter, and wherein the holding means may comprise a resilient element. It may be herewith achieved that the holding means may adapt to the size and shape of the first inscribed diameter as they are inserted in the ceiling mounted element and/or the tube and then apply a normal force, or expand to its relaxed size after passing a restriction. The resilient element may apply a normal force to the inner surface of the bore or tube. The resilience of the resilient element may be so chosen that the resilient may be able to hold the accessory in place by friction.

In accordance with additional aspects of other embodiments of the present technology, the ceiling mounted element or the tube may comprise a shelf, in which the circumscribed diameter of the accessory will increase as the resilient element expands when the accessory may be aligned with the shelf. The accessory may be hereafter supported on the shelf.

In certain instances, the accessory may be configured with a resilient element that may be able to be retracted or be compressed to assume the size and shape of the first inscribed diameter. Thus, it may be possible to remove the accessory from the skylight.

In specific representations, the resilient element may be a flange protruding from the periphery of the accessory.

In selective illustrations, the resilient element may be formed from an elastomer providing elastic properties.

In some examples, the resilient element may be made of a thermoplastic elastomer. By choosing a thermoplastic polymer there may be provided a material for the resilient element that may be easy to process. For example, the entire holding means may be co-injection molded with a thermoplastic elastomer injected at the resilient element and a thermoplastic polymer having different properties for the remainder of the holding means, i.e., being rigid. Examples of thermoplastic elastomers are TPE-O (olefinic), TPE-S (styrenic), and TPU (urethane).

In accordance with yet additional aspects of other embodiments of the present technology, the accessory may comprise a removal means for removing the accessory from the ceiling mounted element and/or tube, wherein the removal means may be configured for being accessible from the ceiling side of the tubular skylight.

In accordance with still further aspects of other embodiments of the present technology, the removal means may be a means for compressing the resilient element, such that the circumscribed diameter of the accessory may become smaller that the first inscribed diameter.

In certain configurations, the removal means may be a means that enables the user to grip directly by hand the removal means and pull the accessory from the tubular skylight.

In some examples, the removal means may be a means that enable the to attach a tool that enables pulling the accessory from the tubular skylight.

In accordance with yet still further aspects of other embodiments of the present technology, it may be achieved that the forces required to remove the accessory may be applied close to the location of the holding means. Therefore the first element may be almost completely unaffected by the forces applied when the accessory may be removed from the tubular skylight. Therefore the first element may not have to be designed to withstand these forces.

In selective forms, the removal means may comprise a handle. The handle may be designed especially to be grasped by the hand.

In accordance with aspects of other embodiments of the present technology, the holding means may comprise a first retaining means configured for retaining the first element. It may be herewith achieved that the first disc-shaped element may be held in position by the holding means.

In accordance with certain aspects of certain embodiments of the present technology, the accessory may comprise at least one additional element, wherein the at least one additional disc-shaped element may be coaxial with the first disc-shaped element and wherein the holding means may comprise additional disc retaining means for retaining the at least one additional element. The first disc retaining means and the additional disc retaining means may be spaced such that the disc-shaped elements are located in the accessory with an interspace between adjacent disc-shaped elements.

It may be herewith achieved that the U-value of the accessory may be decreased dependent on the materials used. The overall U-value of the tubular skylight will benefit from this alternative. The U-value is a measure of heat transmission through a building part, with lower numbers indicating better insulating properties. The U-value of the accessory may be further decreased by adding additional disc-shaped elements. The first disc-shaped element and the additional disc-shaped elements may be provided in identical materials in one embodiment or in different materials in other embodiments.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The invention will be explained in more detail below with reference to the accompanying figures, where:

FIG. 2 is perspective view portions of an embodiment of a tubular skylight according to the present invention;

FIG. 3 is an exploded view of an embodiment of a tubular skylight according to the present invention;

Figure 1:
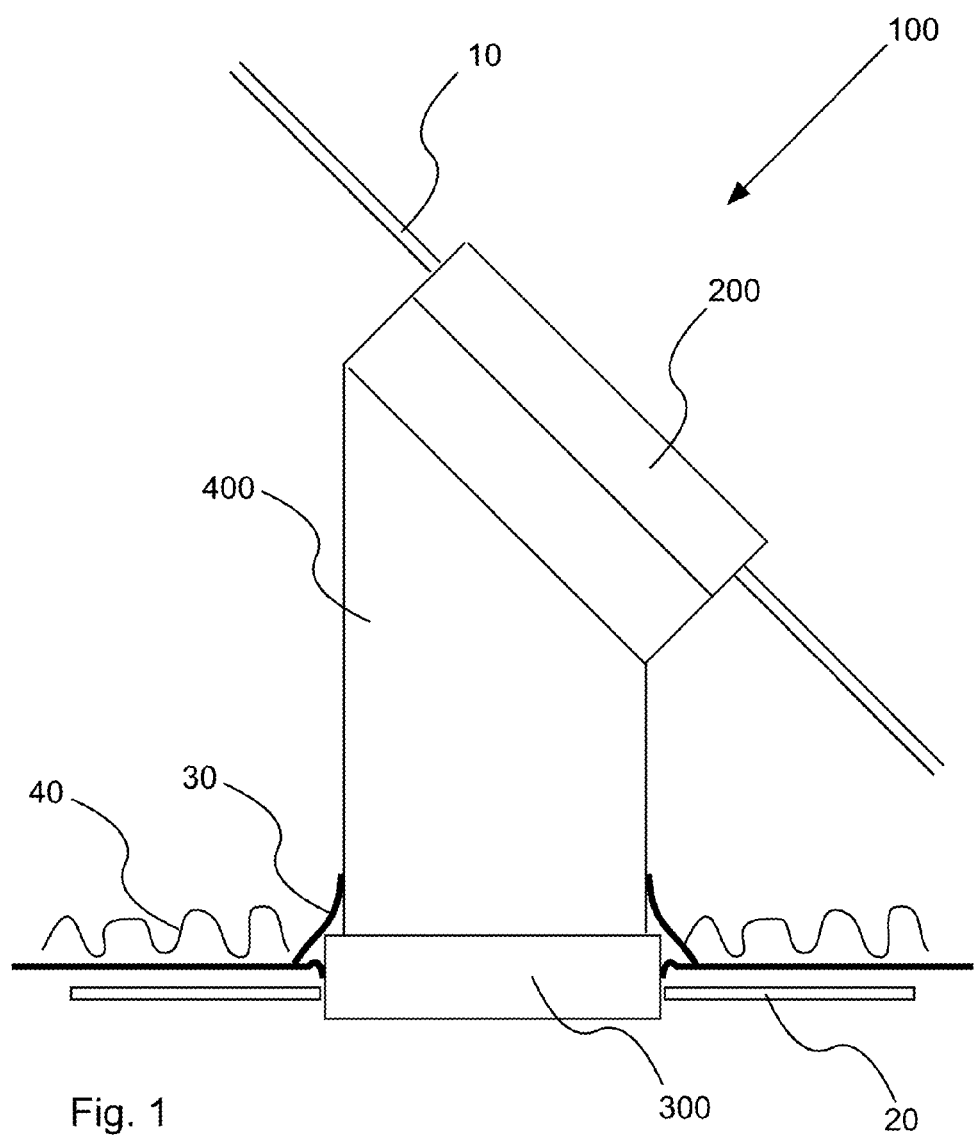
FIG. 1 is a schematic view of an embodiment of a tubular skylight according to the present invention.

It should be emphasized that the embodiments shown are used for example purposes only and should not be used to limit the scope of the invention.

DETAILED DESCRIPTION OF THE INVENTION

The present invention may be understood more readily by reference to the following detailed description, examples, drawings, and claims. However, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

In the explanation of the figures, identical or corresponding elements will be provided with the same reference numerals in different figures. Therefore, no explanation of all details will be given in connection with each single figure/embodiment.

FIG. 1 illustrates tubular skylight 100. The tubular skylight 100 comprises a roof mounted element 200, a ceiling mounted element 300, and a tube 400 connecting the roof mounted element 200 and the ceiling mounted element 300.

The roof mounted element 200 is attached to the roof structure 10 of a building and the ceiling mounted element 300 is attached to the ceiling structure 20 of a room (not shown) in the building in which the tubular skylight 100 is installed. The skilled person will be able to choose among many methods of connecting the individual elements and the respective structure.

Light enters the tubular skylight 100 through the roof mounted element 200 through a window pane (not shown). The light continues through the tube 400 and exits the tubular skylight 100 through the ceiling mounted element 300 that is equipped with a diffuser element 340, as illustrated in FIGS. 2, 3, 5 and 6. Thereafter, the light enters the room below the ceiling 20.

The building vapor barrier in the ceiling structure is penetrated by the tubular skylight 100. In order to retain the vapor barrier effect, a vapor barrier 30 is attached to the tube 400 and to the building vapor barrier such that the building's vapor barrier remains unbroken even after the installation of the tubular skylight 100. In the illustrated embodiment, the vapor barrier 30 is also attached to the ceiling mounted element 300. In alternative embodiments (not shown) the vapor barrier 30 may be attached only to the ceiling mounted element 300 or only to the tube 400. The vapor barrier 30 may be completely or partly covered with a layer of insulating material 40.

FIGS. 2 and 3 illustrate the tubular skylight 100 of FIG. 1 in a three-dimensional view and an exploded view, respectively. More specifically, FIGS. 2 and 3 show the tube 400 and the ceiling mounted element 300 with its main constituents. The ceiling mounted element 300 comprises a ceiling ring 320 and a diffuser element 340. In the illustrated embodiment, the ceiling mounted element further comprises an accessory 500. The ceiling ring 320 is attached to the ceiling structure 20. The tube 400 is positioned such that it is coaxial with the ceiling ring 320. The tube 400 is secured to the ceiling ring 320 by a press fit into a recess in the ceiling ring 320. Alternatively, suitable attachment means may be, for example, screws, nuts and bolts, rivets, hose clamps, snap hooks, wedges or a wedge ring.

The diffuser element 340 is removably attached to the ceiling ring 320. The diffuser element 340 serves to diffuse the light entering the room from the tubular skylight 100. In the illustrated embodiment, for example FIG. 10, the accessory 500 is installed in the ceiling mounted element 300, more specifically the ceiling ring 320. As examples, accessory 500 may be a thermal insulator, for decreasing the U-value of the tubular skylight 100; a filter, for affecting the properties of the light entering the diffuser element 340; a lamp, for providing light when it is dark outside the building or for adding to the light entering through the tubular skylight 100; or any other type of accessory suitable for use in a tubular skylight 100.

Figure 4:
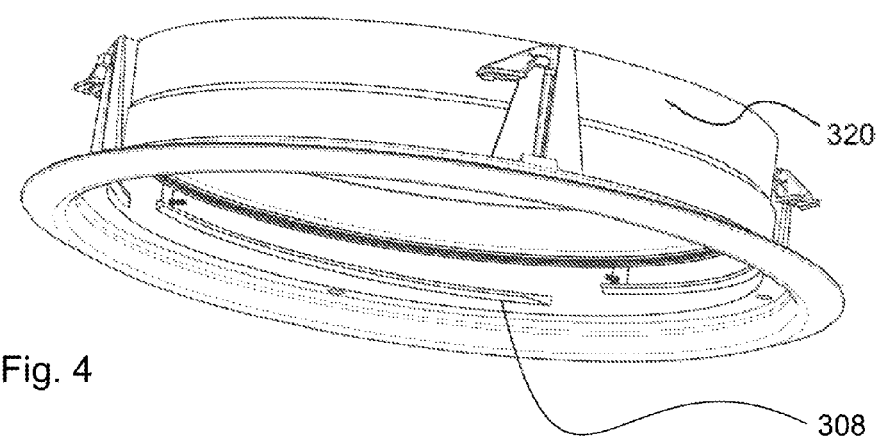
FIG. 4 is perspective view of an embodiment of a ceiling ring according to the present invention.
Figure 5:
FIG. 5 is perspective view of an embodiment of a diffuser element according to the present invention.

FIG. 4 illustrates a ceiling ring 320 and FIG. 5 illustrates a diffuser element 340 that is removably attachable to the ceiling ring 320.

Figure 6:
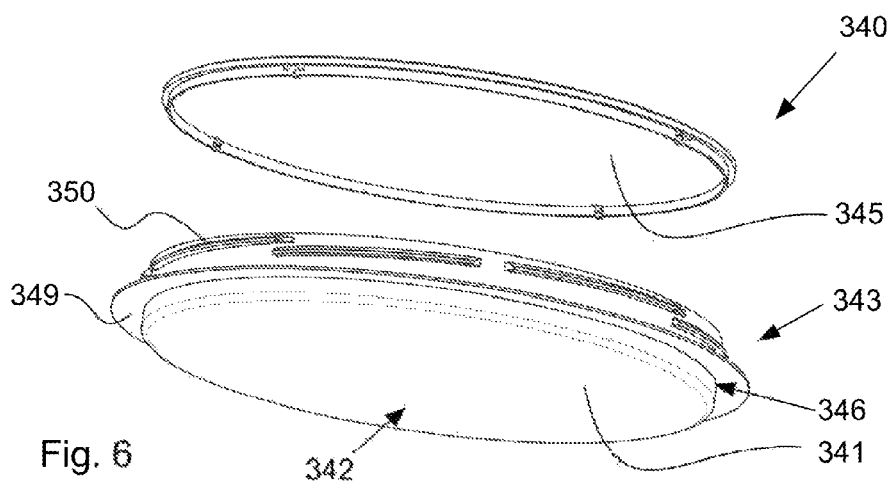
FIG. 6 is an exploded view of an embodiment of a diffuser element according to the present invention.
Figure 10:
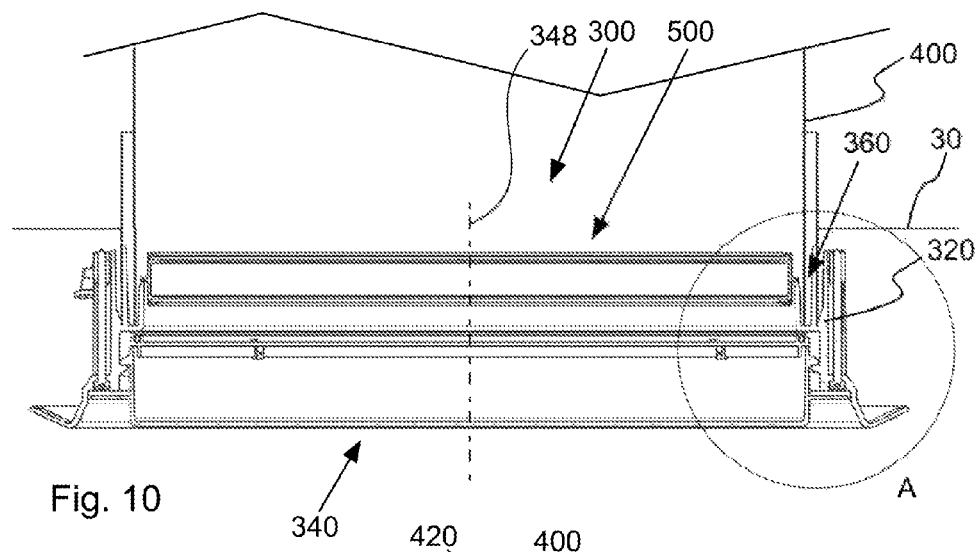
FIG. 10 is a section view taken at C:C in FIG. 1 of an embodiment of a tubular skylight according to the present invention.
Figure 11:
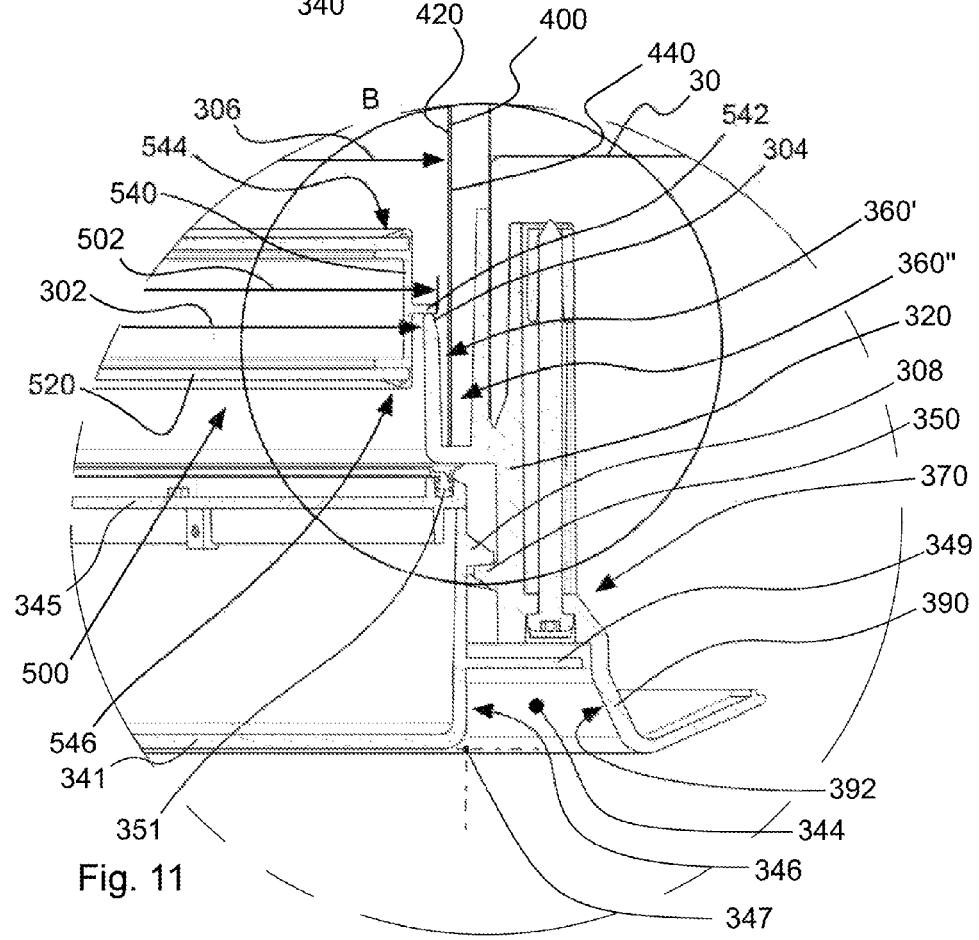
FIG. 11 is an enlarged cross-section view of detail A of FIG. 10 of an embodiment of a tubular skylight according to the present invention.

FIG. 6 illustrates an exploded view of the diffuser element 340 of FIG. 5. The diffuser element 340 comprises a first diffuser pane 341 and a second diffuser pane 345. The first diffuser pane 341 comprises a bottom portion 342 and a sidewall portion 343. In the illustrated embodiment, the bottom portion 342 is planar, the width-to-height ratio is infinite. In alternative embodiments, the bottom portion may be curved with a width-to-height ratio as low as 6:1. The bottom portion 342 is translucent. The sidewall portion 343 and the bottom portion 342 adjoin along a transition line 347, as illustrated in FIG. 11. The transition line 347 is located where the tangents of the external surfaces of the bottom portion 342 and the sidewall portion 343 intersect. In the embodiment depicted, the transition line 347 is rounded, i.e., the external surfaces of the bottom portion 342 and the sidewall portion 343. Therefore the transition line 347 is an imaginary line. In alternative embodiments the transition line 347 could be sharp or chamfered. The sidewall portion 343 is substantially parallel with the central axis 348 through the diffuser, as illustrated in FIG. 10. The sidewall portion 343 has a light path zone 346. The light path zone 346 is more translucent than the bottom portion 342. In one embodiment, the entire sidewall portion 343 is transparent. The translucency is not illustrated on the figures.

To provide enhanced light outside the bottom portion 342, the light path zone 346 in the current embodiment may be clear or transparent. In other embodiments, the light path zone 346 may be engraved, or the light path zone 346 may have engraved dots or lines, or the diffuser material may contain light refractive or diffusing particles in the light path zone 346.

The second diffuser pane 345 is mounted on top of the first diffuser pane 341. In the embodiment depicted, the sidewall portion 343 doubles as a spacer element. The spacer element provides a distance between the first diffuser pane 341 and the second diffuser pane 345. Thus, a closed air space is provided between the first and second diffuser pane 341, 345.

A ledge 349 protrudes from the sidewall portion 343. The ledge 349 is located above the light path zone 346, so that it does not obstruct the light coming through the light path zone 346. The sidewall portion 343 and the ledge 349 form a circular step at the periphery of the diffuser bottom portion 342. In the illustrated embodiment, the diffuser element 340 is circular. An external thread 350 is formed on the sidewall portion 343. The thread 350 is positioned above the ledge 349. A cooperating internal thread 308 is formed in the ceiling ring 320, as illustrated in FIG. 4.

In one example the diffuser sidewall portion 343, the bottom portion 342, the light path zone 346 and the ledge 349 and the thread 350 is translucent. However, this does not exclude other opaque components.

The diffuser element 340 can be installed into the ceiling ring 320 by aligning the threads 308, 350 and turning the diffuser element 340 clockwise or counter clockwise dependent on the properties of the threads 308, 350.

The diffuser element is further illustrated in FIG. 11.

Figure 7:
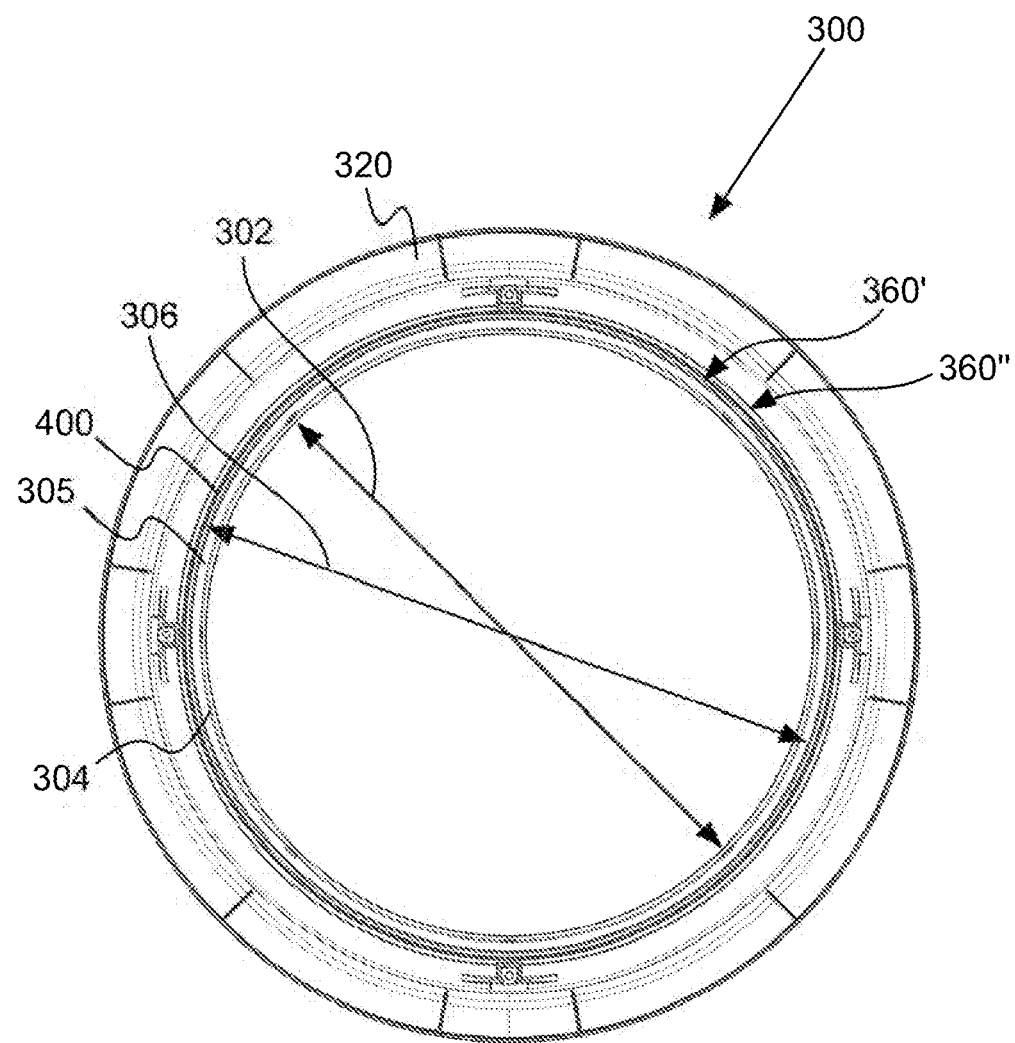
FIG. 7 is a top plan view of an embodiment of a ceiling ring according to the present invention.

FIG. 7 illustrates a top view of the ceiling mounted element 300.

The ceiling mounted element 300 comprises a ceiling ring 320 in which the diffuser element 340 is installed, as illustrated in FIGS. 2 and 3.

The ceiling mounted element 300 has a bore and the tube 400 has a bore, as illustrated in FIG. 11. The ceiling mounted element 300 has the smaller bore of the two, therefore the first inscribed diameter 302 in the present embodiment is located where the bore of the ceiling mounted element 300 is smallest.

A shelf 304 is arranged in the ceiling mounted element for supporting the accessory 500 when it is installed in the tubular skylight 100, as illustrated in FIG. 3. The shelf 304 has a support surface 305. The maximum area available for the support surface 305 is bounded by the first inscribed diameter 302 and the second inscribed diameter 306. In the illustrated embodiment, the second inscribed diameter 306 has a maximum value equal to the inner diameter of the tube 400. The first inscribed diameter 302 and the second inscribed diameter 306 is also illustrated in FIG. 11.

In the embodiment illustrated in FIG. 7, the support surface 305 terminates before the tube 400 leaving a free space available for the first condensate collector 360'.

Figure 8:
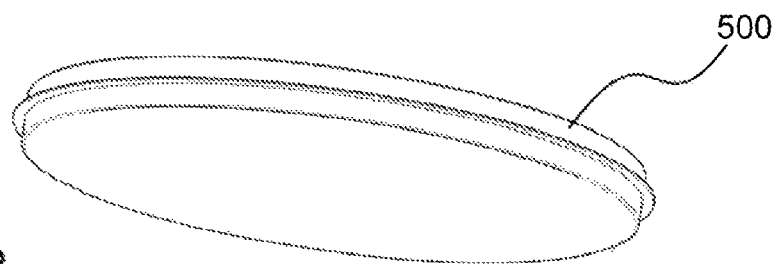
FIG. 8 is perspective view of an accessory according to the present invention.
Figure 9:
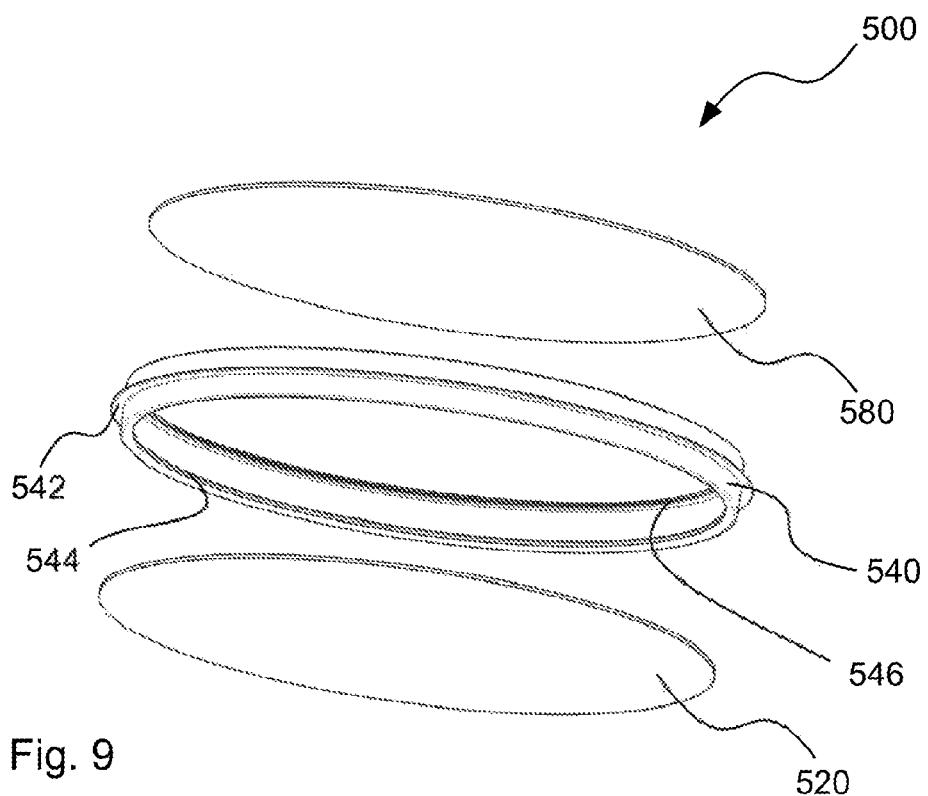
FIG. 9 is exploded view of an accessory according to the present invention.

FIG. 8 illustrates an accessory 500 suitable for r mounting in the tubular skylight 100 of FIG. 1. FIG. 9 illustrates an exploded view of the accessory 500 of FIG. 8. In the embodiment depicted, the accessory 500 comprises a first element 520, a holding means 540, and an additional element 580. In the embodiment shown, each of the first element 520 and the additional element 580 is a rigid disc-shaped element. Alternatively the first element 520 and/or the additional element 580 could be a ring.

The holding means 540 comprises a resilient element 542 in the form of a flange protruding from the periphery of the accessory 500. The holding means 540 comprises a first retaining means 544 that retains the first element 520 and an additional retaining means 546 that retains the additional element 546 upon insertion of said first and additional elements 520, 580 into the holding means 540. The first element 520 and the additional element 546 is separated by an interspace. FIG. 11 illustrates some of such details.

Figure 12:
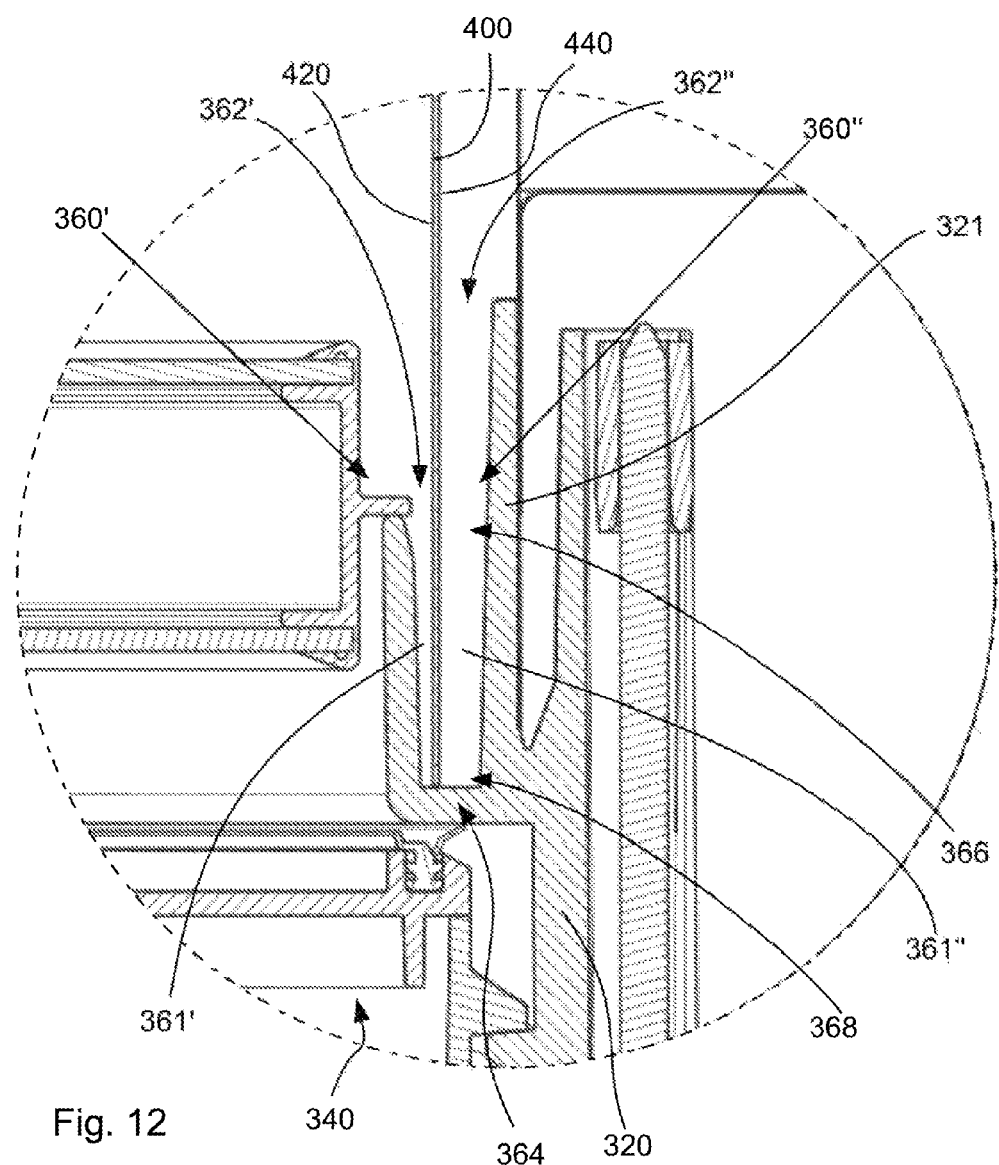
FIG. 12 is an enlarged cross-section view of detail B of FIG. 11 of an embodiment of a tubular skylight according to the present invention.

FIG. 10 is a section view of the tubular skylight 100 near the ceiling mounted element, FIG. 11 shows detail A of FIG. 10, and FIG. 12 shows detail B of FIG. 11.

Condensate may develop on the internal surface 420 of the tube 400 when the internal surface 420 has a temperature below the dew point of the air inside the tube 400. The condensate may eventually form droplets that run down the internal surface 420 of the tube 400. The tubular skylight 100 comprises a first condensate collector 360' for collecting the condensate running down the internal surface 420 of the tube 400 and a second condensate collector 360" for collecting condensate running down the external surface 440 of the tube 400.

The first condensate collector 360' has a first receptacle for storing condensate and a first inlet 362' to the first receptacle 361'. The first inlet 362' is in communication with the internal surface 420 of the tube 400, so that condensate running down the internal surface 420 of the tube is collected by the first condensate collector 360'. The first inlet 362' is located in a position upstream of the diffuser element 340 such that the condensate running down the internal surface 420 of the tube 400 enters the first condensate collector 360' before it enters the diffuser element 340.

The second condensate collector 360" comprises a second receptacle 361" for storing condensate and a second inlet 362" to said second receptacle 361". Said second inlet 362" is in communication with the external surface 440 of the tube 400. Therefore condensate running down the external surface 440 of the tube 400 is collected in the second condensate collector 360". Condensate running down the external surface 440 of the tube is therefore prevented from entering the diffuser element 340 or entering the ceiling structure.

The first and second condensate collector 360', 360" is established by a groove 364 formed in the ceiling ring 320. The tube 400 extends into the groove 364 and divides the groove 364 into two separate elements constituting the first and second condensate collector 360', 360". The groove 364 has an upper end 366 in a higher position closer to the roof mounted element 200 than its lower end 368 that is in a lower position closer to the ceiling mounted element 300. From FIG. 12 it appears that the first and second inlets 362', 362" to the first and second condensate collectors 360', 360", respectively, are located at the upper end 366 of the groove 364. The groove 364 has a tapered cross-section. The upper end 366 is wider than the lower end 368 and therefore has a greater surface area. The groove 364 is formed with a combination of a polygonal and substantially V-shaped cross-section. One leg of the V is longer than the other, namely the leg that, together with the tube, forms the second condensate collector 360". In alternative embodiments the cross-section may be U-shaped (not shown). In the embodiment illustrated in FIGS. 9, 10, and 11, the groove 364 is closed at its lower end 368. Therefore the groove 364 forms a reservoir for condensate. The condensate collected in each condensate collector 360', 360" will evaporate when the temperature and moisture conditions in the environment in the vicinity of the tubular skylight 100 so allows. Therefore the level of condensate in the condensate collectors 360', 360" will vary over time. Based on the environment that the tubular skylight 100 will be subject to, the skilled person will be able to size the groove 364 and the respective condensate collectors 360', 360", such that it will be capable to hold the necessary amount of condensate.

The tube 400 extends into the groove 364. The tube 400 is supported on the bottom of the groove 364. The tube end does not seal tightly against the bottom of the groove 364. Therefore the first and second receptacle 361', 361" are fluidly connected. The condensate level in each receptacle 361', 361" is therefore substantially even. The groove 364 is an annular groove that is formed in the ceiling mounted element 300, more specifically in the ceiling ring 320, as illustrated in FIG. 7. In the embodiment depicted, the accessory 500 is installed in the ceiling mounted element 300. The ceiling mounted element 300 comprises a shelf 304. The shelf 304 has a support surface 305, as illustrated in FIG. 7. The accessory 500 is resting on the support surface 305. The support surface 305 is bounded on one side by the first inscribed diameter 302. The support surface 305 terminates before the tube 400 leaving a free space available for the first condensate collector 360', more specifically the first inlet 362', as illustrated in FIG. 12.

The flange of the resilient element 542 protrudes from the holding means 540 in its relaxed state. The circumscribed diameter 502 of the accessory 500 including the resilient element 542 is larger than the first inscribed diameter 302. Therefore the resilient element 542 in its relaxed state overlaps the support surface 305, such that accessory is supported on the shelf 304. During insertion of the accessory 500 into the ceiling mounted element 300, the resilient element 542 is compressed as it passes through the ceiling ring 320 because the ceiling ring 320 has a first inscribed diameter 302 that is smaller than the circumscribed diameter 502 of the accessory 500. As the accessory 500 is inserted further the resilient element 542 becomes free of the ceiling ring 320. The resilient element 542 expands to its larger relaxed state. The accessory can then be lowered until it rests on the shelf 304. The first and additional retaining means 544, 546 each comprises two flanges that grip the respective first and additional elements 520, 546.

The holding means 540 is annular. Alternatively the holding means 540 could comprise a plurality of discrete protrusions that protrude radially at the periphery of the holding means 540.

FIGS. 10, 11 and 12, the diffuser element 340 is installed into the ceiling ring 320. The diameter of the sidewall 343 substantially matches the diameter of the tube 400. A light passage from the light path zone 346 to the room is provided in the form of a free space 344 adjacent the light path zone 346. The free space 346 is outlined by the sidewall portion 343, the ledge 349 and the ceiling ring 320. In one example the outline of the free space 344 in a plane extending radially from the central axis 348 is substantially square, rectangular or having a polygonal shape. In one other example the outline of the free space 344 in a plane extending radially from the central axis 348 is substantially square and has a height which corresponds to the height of the sidewall light path zone 346.

A reflector 390 is integrated into the ceiling ring 320. The reflector 390 has a reflective surface 392 facing the light path zone 346 at an acute angle in relation to the central axis 348, as illustrated in FIG. 10. Part of the light rays exiting the light path zone 346 strikes the reflective surface 392 of the reflector 390 and is directed towards the room. The reflector 390 may for example have a white reflective surface 392 which provides good reflection properties.

In embodiments with a reflector 390, the free space 344 is outlined by the sidewall portion 343, the ledge 349, the reflector 390 and in some cases also the ceiling ring 320. The leg of the outline defined by the reflector 390 will have an acute angle in relation to the central axis 348, as illustrated in FIG. 10.

FIG. 11 illustrates how the ledge 349 covers and thereby hides the installation accessories 370. Installation accessories 370 may be for example; a fastener clamp as shown operated by a fastener or it may be a hole with a screw secured into the ceiling. The ledge 349 functions similar to a trim ring. The ledge 349 forms a ring extending radially from the side wall portion 343 across the installation accessory 370 to the ceiling ring reflector 390. The ledge 349 thereby extends substantially across the free space 344.

The second diffuser pane 345 is equipped with a seal 351 that seals against a sealing surface on the ceiling ring 320 when the diffuser element 300 is fully inserted into the ceiling ring 320.

In one example the free space 344 allows access for a user to grasp the diffuser element at the light path zone 346, where after the diffuser element 340 can easily be installed and also later removed with fingers by the end user. Preferably, this is enabled by fastening means where rotation secures the diffuser element 340, such as a thread or matching teeth and slots. Easy removal and installation of the diffuser element 340 enables the end-user to clean or to upgrade the product with additional accessories 500, for example a light filter or a lamp.

The general shape of the bottom portion 342 and sidewall portion 343 and the ledge 349 of the current embodiment enables the diffuser element 340 to be unitary and injection molded. In one alternative, the bottom portion 342 and the ledge 349 may be in the same plane (not illustrated). In this alternative the light path zone 346 would be above the ledge 349.

Figure 13:
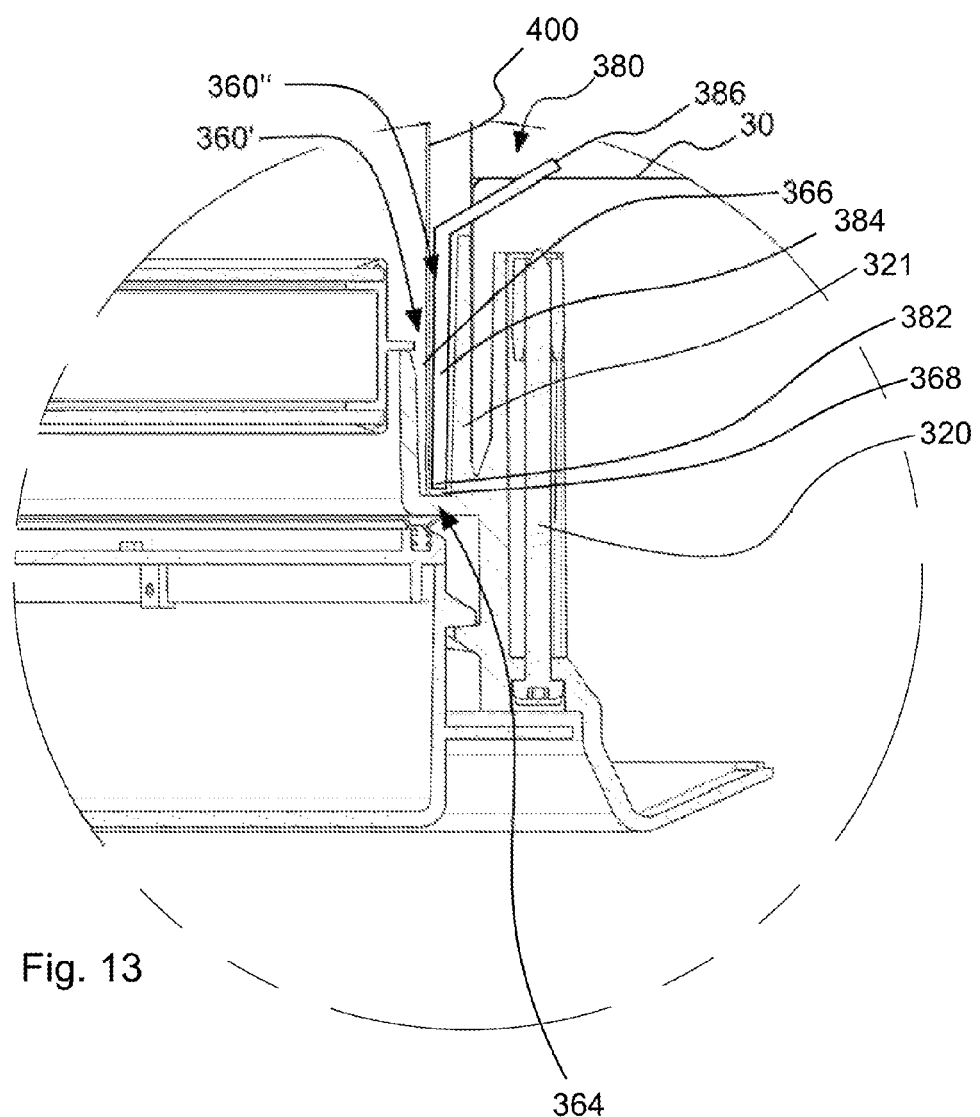
FIG. 13 is an enlarged cross-section view of detail A of FIG. 10 of an embodiment of a tubular skylight according to the present invention.

FIG. 13 illustrates detail A of FIG. 10 in a second embodiment of the invention in which the first and second condensate collectors 360', 360" comprise a drain 380 for removing condensate from the condensate collectors 360', 360". The drain 380 comprises a drain pipe 384. The drain pipe 384 extends into the groove 364 at one end and through the vapor barrier 30 at the other end. The drain pipe 384 has a drain inlet 382 at the lower end 368 of the groove 364 and a drain outlet 386 on outside the vapor barrier 30. The drain outlet 386 is in corn communication with a discharge. In the embodiment shown, the condensate is discharged through evaporation to the surrounding. In alternative embodiments the discharge is a pump or a heated evaporator. As the first and second condensate collectors 360', 360" are fluidly connected the drain pipe 384 will remove condensate from both condensate collectors 360', 360". In alternative embodiments where the first and second condensate collectors 360', 360" are separated two drain pipes may be required.

The ceiling ring 320 has an attachment collar 321 for the vapor barrier 30. The attachment collar 321 is composed by the exterior wall of the second condensate collector 360". The exterior wall of the second condensate collector 360" is spaced from the installation accessory 370, creating a recess between the installation accessory 370 and the exterior wall forming the attachment collar 321 where the vapor barrier 30 is inserted and fixed.

The vapor barrier 30 may also be fixed to the tube 400. In one example the vapor barrier 30 cross-section is T or Y-shaped so that one portion can be fixed to the tube 400 and another portion can be fixed to the attachment collar 321 and the third portion can extend across the ceiling 20. With this arrangement, the attachment of the vapor barrier 30 to the ceiling mounted element 300 can be performed in an easy manner. The attachment collar 321 is very accessible because it can be arranged such that no other component is obstructing the direct access it. Moreover, the height of the attachment collar 321 can be increased to further improve the accessibility. In addition, in applications involving a large ceiling thickness, large installation accessories are needed. By separating the installation accessories and the attachment collar by a recess, it is not necessary to extend the attachment collar up past the end of the installation accessories. In this way, a material reduction for the manufacture of the ceiling ring can be achieved.

Figure 14:
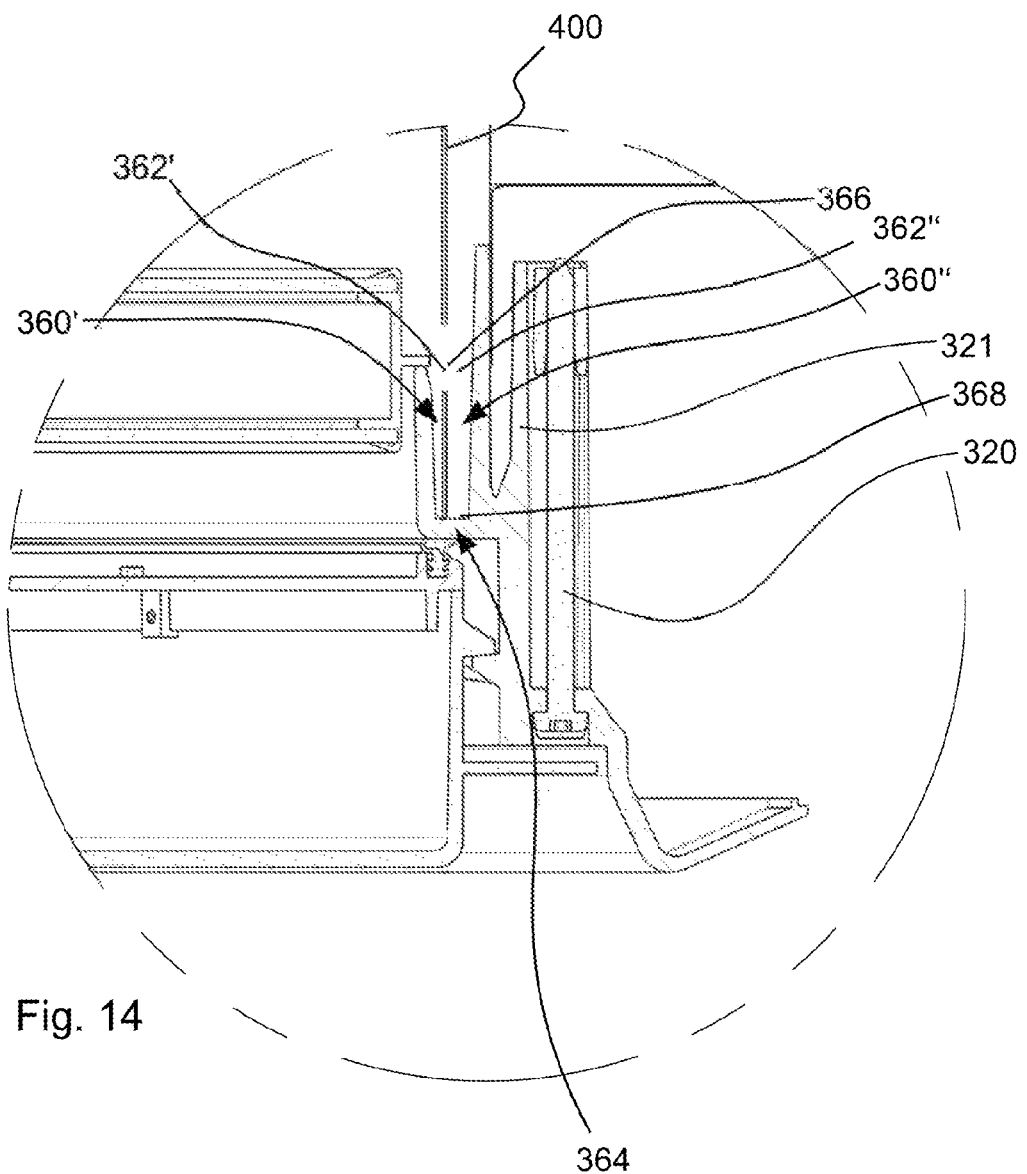
FIG. 14 is an enlarged cross-section view of detail A of FIG. 10 of an embodiment of a tubular skylight according to the present invention.

FIG. 14 illustrates detail A of FIG. 10 in a third embodiment of the invention. In this embodiment, the tube 400 terminates above the first and second condensate collector 360', 360". The first and second inlets 362', 362" are the same.

Figure 15:
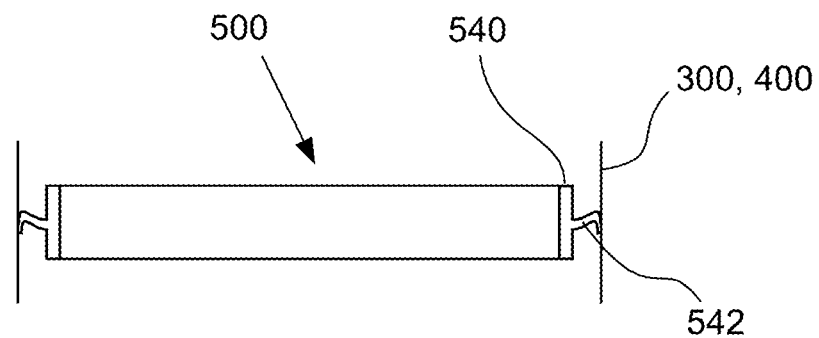
FIG. 15 is schematic view of an accessory according to the present invention, installed in the ceiling mounted element or the tube.

FIG. 15 illustrates a schematic view of the accessory 500 in an embodiment installed in the ceiling mounted element 300 or the tube 400.

The holding means 540 has a resilient element 542. When inserted into the ceiling mounted element 300 or the tube 400, the resilient element 542 is deformed and therefore applies a normal force on the inner surface of the bore of the ceiling mounted element 300 or the tube 400. The accessory 540 is thereby retained via friction between the resilient element 542 and the ceiling mounted element 300 or the tube 400 respectively.

Figure 16:
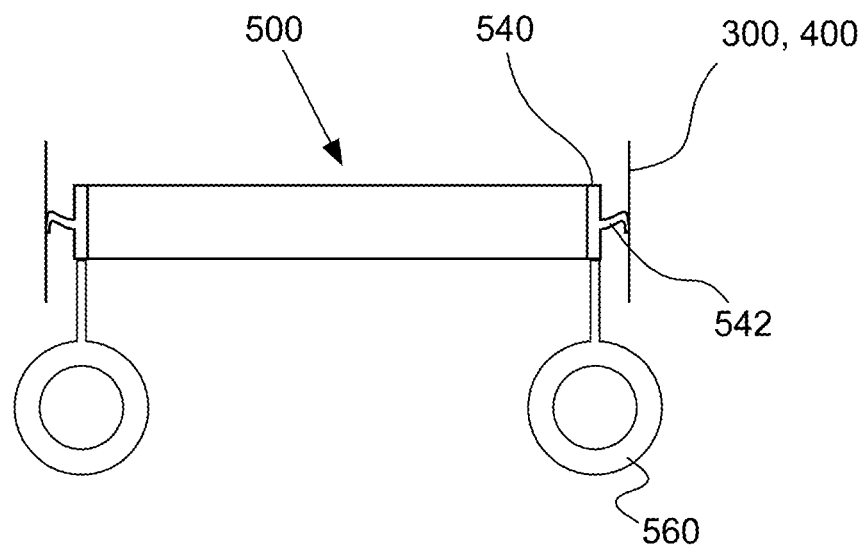
FIG. 16 is schematic view of an accessory according to the present invention, having a removal means.

FIG. 16 illustrates a schematic view of the accessory 500 in an embodiment having removal means 560 in the form of handles.

When it is required to remove the accessory 500, a user can grip the handles and pull the accessory from the ceiling mounted element 300 or the tube 400.

Figure 17:
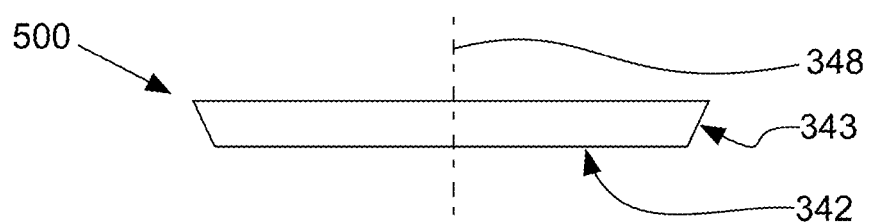
FIG. 17 is a side elevation view of an embodiment of the diffuser element according to the present invention.

FIG. 17 illustrates a side view of a second embodiment of the diffuser element 340. In this embodiment, the side wall portion 343 is inclined twenty-five degrees in relation to the central axis 348.

Figure 18:
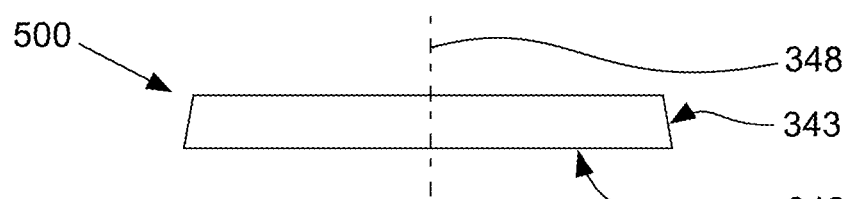
FIG. 18 is a side elevation view an embodiment of the diffuser element according to the present invention.

FIG. 18 illustrates a side view of a third embodiment of the diffuser element 340. In this embodiment the sidewall portion 343 is inclined −10° in relation to the central axis 348.

It is to be noted that the figures and the above description have shown exemplary embodiments in a simple and schematic manner. It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined only by a fair reading of the claims that follow.

The invention claimed is:

1. A tubular skylight (100) comprising:
    a roof mounted element (200);
    a ceiling mounted element (300);
    a tube (400) connecting the roof mounted element (200) and the ceiling mounted element (300);
    a diffuser element (340), the diffuser element (340) being mounted in the ceiling mounted element (300), the diffuser element (340) including a first diffuser pane (341), the first diffuser pane (341) having a translucent bottom portion (342) and a sidewall portion (343) with a translucent light path zone (346);
    wherein the tubular skylight (100) has means for affecting the luminance of the light exiting the diffuser such that the luminance of light exiting through the light path zone (346) has a different luminance than light exiting through the bottom portion (342), wherein the bottom portion (342) is substantially planar and has a width-to-height ratio of greater than 6:1, wherein the bottom portion (342) adjoins the sidewall portion (343) at a transition line (347), wherein the sidewall portion (343) is substantially parallel to a central axis (348) through the diffuser element (340), and wherein the ceiling mounted element (300) and the diffuser element (340) provide a light passage from the light path zone (346) to the room by a free space (344) adjacent the light path zone (346).

2. A tubular skylight (100) according to claim 1, wherein the sidewall portion (343) has a substantially planar cross-section in a plane extending radially from the central axis (348).

3. A tubular skylight (100) according to claim 1, wherein the sidewall portion (343) is inclined between 25° to −10° in relation to the central axis (348).

4. A tubular skylight (100) according to claim 1, wherein the transition line (347) is one of chamfered and rounded.

5. A tubular skylight (100) according to claim 1, wherein the tubular skylight (100) comprises a reflector (390), wherein the reflector (390) has a reflective surface (392) facing the light path zone (346), and wherein the reflective surface (392) resides at an acute angle in relation to the central axis (348) and with a vertex above the bottom portion (342).

6. A tubular skylight (100) according to claim 1, wherein the diffuser element (340) includes a second diffuser pane (345) and a spacer element that spaces the second diffuser pane (345) from the first diffuser pane (341) and provides a closed air space between the first and second diffuser panes (341, 345).

7. A tubular skylight (100) according to claim 1, wherein the diffuser element (340) includes a ledge (349), wherein the ledge (349) is protruding from the sidewall portion (343), and wherein the light path zone (346) is disposed between the ledge (349) and the bottom portion (342).

8. A tubular skylight (100) according to claim 1, wherein the diffuser element (340) is circular, an external thread (350) is disposed on the sidewall portion (343), and a cooperating internal thread (308) is disposed in the ceiling mounted element (300).

9. A tubular skylight (100) according to claim 1, wherein the light path zone (346) is more translucent than the bottom portion (342).

10. A diffuser element (340) for mounting in a tubular skylight (100) in a room, comprising:
    a diffuser element (340) mounted in a ceiling mounted element (300), the diffuser element (340) including a first diffuser pane (341) with a bottom portion (342) and a sidewall portion (343), wherein the bottom portion (342) is translucent, wherein the sidewall portion (343) has a light path zone (346) that is more translucent than the bottom portion (342), wherein the bottom portion (342) is substantially planar having a width-to-height ratio of greater than 6:1, wherein the bottom portion (342) adjoins the sidewall portion (343) at a transition line (347), wherein the sidewall portion (343) is substantially parallel to a central axis (348) through the diffuser element (340), and wherein a free space (344) adjacent the light path zone (348) defines a light passage from the light path zone (346) to the room.

\* \* \* \* \*